W. H. HENNAH & A. K. W. RISSEL.
MEANS FOR RECORDING AND GAGING A SHIP'S DEVIATIONS FROM ITS COURSE.
APPLICATION FILED AUG. 7, 1909.
994,678.
Patented June 6, 1911.
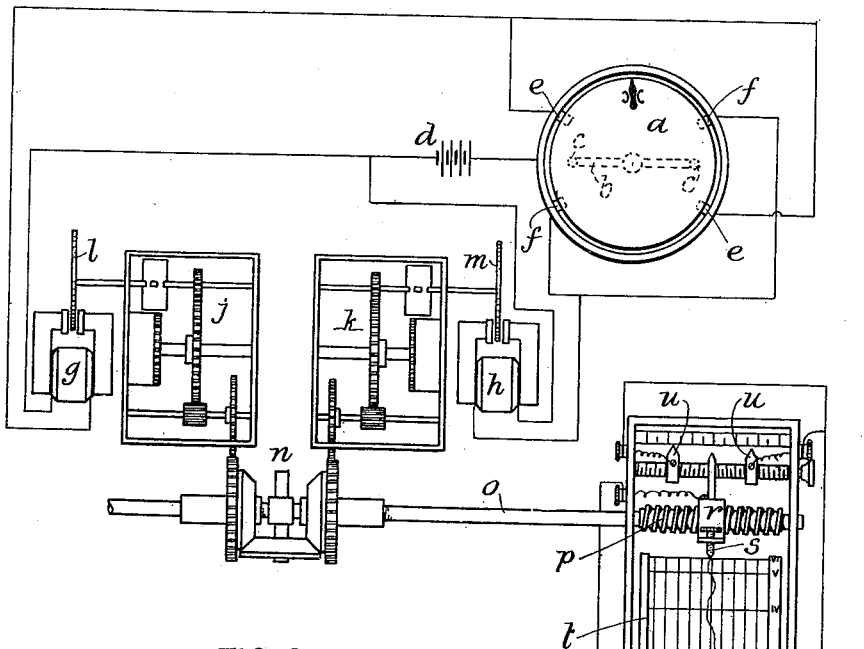
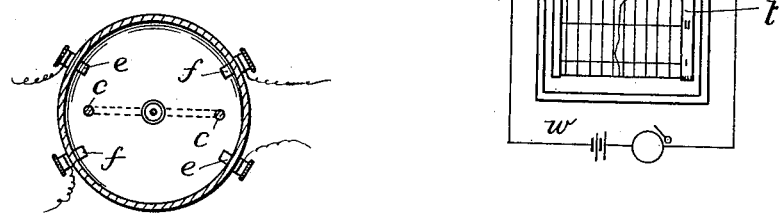
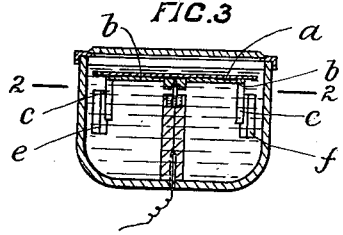
WITNESSES;
INVENTORS,
WILLIAM HENRY HENNAH and
AUGUSTE KERR WAITANGI RISSEL
Attorney.

UNITED STATES PATENT OFFICE.

WILLIAM HENRY HENNAH AND AUGUSTE KERR WAITANGI RISSEL, OF WELLINGTON, NEW ZEALAND.

MEANS FOR RECORDING AND GAGING A SHIP'S DEVIATIONS FROM ITS COURSE.

994,678. Specification of Letters Patent. Patented June 6, 1911.

Application filed August 7, 1909. Serial No. 511,807.

*To all whom it may concern:*

Be it known that we, WILLIAM HENRY HENNAH and AUGUSTE KERR WAITANGI RISSEL, subjects of the King of Great Britain, residing at Wellington, New Zealand, have invented a new and useful Improved Means for Recording and Gaging a Ship's Deviations from its Course; and we do hereby declare the following to be a full, clear, and exact description of the same.

This invention relates to improved means that have been devised for recording upon a traveling strip, the deviations of a ship from a set course, and by means of which the degree of deviation and the length of time over which the deviation extends, will be recorded so that the position of a ship relatively to a known starting point may be accurately gaged.

The invention depends for its action upon the movements of the compass bowl of a mariner's compass in relation to the compass card, as the vessel alters its course to one side or other. This movement of the compass bowl is utilized to proportionately vary the strength of two electric circuits arranged in conjunction with the compass, which circuits are normally of equal strength, and thereby to deflect a recording stylus a corresponding amount from a central position upon a traveling record strip. The record strip is caused to travel at a regular rate of speed so that, the speed of the vessel being known, and the angle of deviation from its course and the time during which such deviation has extended being recorded, the exact position of a ship from its known starting point, may be indicated upon a chart.

In the accompanying drawings, means are shown whereby this result may be obtained. These means are shown mainly in diagrammatic form as they may be varied in a number of ways, without departing from the spirit of the invention.

Figure 1 is an illustration of the whole apparatus. Fig. 2 is a sectional plan of a compass arranged to actuate the apparatus, and taken on the line 2—2 of Fig. 3. Fig. 3 is a sectional elevation of such compass.

The form of compass preferably employed, is that known as a spirit or liquid compass, and in which the compass card is immersed in liquid contained in the bowl. In this invention the card $a$ has a metal bar $b$ attached to its underside and arranged to extend across it at right angles to the magnet, so as not to influence the magnetism. From the two ends of this bar, metal pins $c$ project downward. The bar $b$ is connected with one pole of an electric battery $d$ preferably by means of a wire running up the central support of the card, as shown in Fig. 3.

Secured to the inside of the compass bowl are the metallic blocks $e$—$f$, four of which are provided and which are arranged to lie one on each side of each end of the bar $b$. The bowl is made capable of adjustment in relation to the card, so that when a course has been set, the bowl will be turned to cause the two blocks at each end of the bar $b$ to lie at equal distances away from the pin $c$ projecting downward thereon. The two blocks adjacent to each end of the bar are arranged respectively in circuit with a pair of electro-magnets $g$—$h$ from both of which magnets, a common return leads to the battery $d$. The two blocks of both pairs lying respectively diametrically opposite to each other are electrically coupled together, as shown in Fig. 1. The liquid within the compass bowl will thus act as a resistance conductor between the pins $c$ and the blocks $e$—$f$ so that the current from the battery will continuously flow through both magnets. So long as the bar $b$ lies at equal distances between the blocks, the amount of current flowing through both magnets will be the same, so that they will be of equal strength. As the bowl moves in relation to the card with the swing of the ship, the distance between the bar ends and the blocks will be relatively altered, so that the extra amount of intervening liquid between the bar and the block on one side will act as a greater resistance to the flow of the current to that side, while the resistance upon the other side will be correspondingly lessened. Thus, the strengths of the currents passing through the two magnets will be varied correspondingly and in direct ratio with the relative positions of the bar $b$ to the blocks. Consequently, the strengths of the magnets will be varied at the same ratio.

Arranged adjacent to each magnet, is a set of spring actuated or other gearing $j$—$k$, both of which sets are arranged to rotate normally at the same rate of speed, and are driven continuously. Each of these mechanisms is controlled in its rotation by an ordinary control fan in the well known way. In this invention, the spindles of these fans are extended outward, and metallic disks $l$—$m$ are fixed upon them. These disks pass between the poles of the respective magnets $g$—$h$, so that the relative rate of rotation of the mechanisms will be directly governed by the relative strengths of the magnets. Thus, should the vessel swing to bring the blocks $e$ closer to the pins $c$ while the blocks $f$ are moved farther away therefrom, the magnet $g$ will be strengthened, while the magnet $h$ will be proportionately weakened. This will cause the magnet $g$ to exert a greater braking effect on the disk $l$ and thereby to retard the rate of rotation of the mechanism $j$, while the braking effect of the magnet $h$ upon the disk $m$ will be lessened, and thus the rate of rotation of the mechanism $k$ accelerated. These variations will, therefore, be directly controlled by the degree of deviation of the vessel from its set course.

The two mechanisms $j$—$k$ are arranged to gear with the respective outer wheels of an epicyclic train $n$ adapted to impart reverse rotary motion to a spindle $o$ in the well known way by varying the speed of such outer wheels. The variations of this speed being governed by the degree of deviation of the vessel, it will follow that the rate of rotation of this spindle will be also exactly proportionate to the degree of deviation. The direction of its rotation will correspond with the side to which the vessel has deviated.

The spindle $o$ operates a screw thread $p$ on which is mounted a block $r$ carrying a stylus or like device $s$. This stylus rests upon the periphery of a drum $t$, and is adapted by the rotation of the screw to travel transversely across the surface thereof. The drum is driven by clockwork or other mechanism at a fixed rate of speed, and around it is secured a record strip divided transversely into divisions of time corresponding to the rate at which the drum is rotated, and over which the stylus travels as the drum rotates beneath it. The strip is also divided longitudinally into equal divisions upon each side of a central line, such divisions corresponding to relatively short intervals of time.

In use, the vessel's course having been set, the compass bowl is arranged to equalize the currents through the magnets in the manner described, and the stylus block $r$ is placed to coincide with the central line on the strip. Then, should the vessel deviate from its course, rotation will be given the spindle $o$ at a rate proportionate to the degree of deviation, so that the stylus will be caused to travel transversely across the strip at a corresponding rate and in a direction corresponding to the direction of the deviation. As the strip is also traveling beneath the stylus, the stylus, therefore, as it moves transversely, will draw a line at an angle to the center line of the strip, and the degree of this angle will vary directly with the rate of transverse travel of the stylus. The transverse markings will indicate the time at which the deviation commenced, the length of time through which it occurred, and the speed of the vessel being known and the angle of deviation recorded, it follows that the exact position of the ship from a known starting point may be readily gaged. Should the vessel's head be brought back again to the set course, the magnets will again be equalized, so that rotation of the spindle and screw will stop, but the stylus will remain on the strip at the transverse distance away from the center line through which it has moved. It will then indicate that, though apparently the vessel is on its proper course as indicated by the compass, it is actually traveling in a parallel line therewith a distance away equal to the length of the transverse line extending between the center line and the recording line. To bring the vessel back to its true course, a deviation of equal amount must be made to the other side, when the stylus will travel back to the center line of the record.

Provision is made for an alarm being sounded upon the deviation extending over any desired period of time, or upon a number of deviations to the one side aggregating in length of time such fixed period. Means for this purpose are shown in Fig. 1, and consist of a pair of contact blocks $u$ adjustably arranged one on each side of the stylus block $r$ (which is made of suitable metal) and adapted to be engaged by such block as it moves to either side. The block $r$ is connected to one pole of an electric alarm circuit $w$, while the two blocks $u$ are connected to the other pole of such circuit. When, therefore, the stylus block is moved to one side a sufficient distance to engage with the block $u$ on that side, the alarm circuit will be completed and the alarm sounded.

What we do claim as our invention, and desire to secure by Letters Patent, is,—

1. In means for recording and gaging a ship's deviations from its course, a stylus mounted against a traveling record strip and adapted to mark thereon, mechanism for moving such stylus transversely in reverse directions, a pair of electromagnets controlling such mechanism, and means whereby such magnets may be proportionately varied in strength in direct ratio to the degree of deviation of the ship to either side of its course, substantially as specified.

2. In means for recording and gaging a ship's deviations from its course, a stylus mounted against a traveling record strip and adapted to mark thereon, mechanism for moving such stylus in reverse directions, a pair of electromagnets controlling such mechanism, a mariner's compass, a pair of electric circuits in circuit with the respective electromagnets and with the compass, and means upon the compass whereby such circuits may be proportionately and reversely varied in strength in direct ratio to the degree of deviation of the ship to either side of its course, substantially as specified.

3. In means for recording and gaging a ship's deviations from its course, a mariner's compass, a conductor bar carried across it and connected with one pole of an electric circuit, a compass bowl, terminal blocks upon the compass bowl arranged on each side of the conductor bar and in electrical communication therewith by resistances varying directly with the distance between a pair of electromagnets respectively in circuit with the terminal blocks and the other pole of the electric circuit, and means whereby the variations in the strengths of such magnets may be caused to actuate a recording mechanism in reverse directions, substantially as specified.

In testimony whereof we have signed this specification in the presence of two sub-

WILLIAM HENRY HENNAH.
AUGUSTE KERR WAITANGI RISSEL.

Witnesses:
W. ALEXANDER,
WILMOT BORLASE.

Copies of this patent may be obtained for five cents each, by addressing the "Commissioner of Patents, Washington, D. C."